United States Patent [19]

Indeck et al.

[11] Patent Number: 5,587,654

[45] Date of Patent: Dec. 24, 1996

[54] METHOD AND APPARATUS FOR NOISE REDUCTION IN MAGNETIC MEDIA RECORDINGS

[75] Inventors: Ronald S. Indeck, Olivette; Marcel W. Muller, St. Louis, both of Mo.

[73] Assignee: Washington University, St. Louis, Mo.

[21] Appl. No.: 46,071

[22] Filed: Apr. 9, 1993

[51] Int. Cl.⁶ .......................... G01R 33/12; G01N 27/72; G11B 5/02; G11B 27/34

[52] U.S. Cl. .......................... 324/225; 361/25; 361/31; 324/212

[58] Field of Search .................................. 324/225, 210, 324/211, 212, 262; 361/25, 31

[56] References Cited

U.S. PATENT DOCUMENTS

| | | |
|---|---|---|
| 2,937,241 | 5/1960 | Colbert . |
| 3,535,622 | 10/1970 | Cannon et al. . |
| 3,755,731 | 8/1973 | Young . |
| 4,038,692 | 7/1977 | Umeda et al. ............................. 360/75 |
| 4,258,397 | 3/1981 | Kitamura et al. . |
| 4,806,740 | 2/1989 | Gold et al. . |
| 4,847,558 | 7/1989 | Fisher et al. . |

OTHER PUBLICATIONS

*Noise Correlation of Magnetic Thin Film Media* by Mian, Indeck, and Muller. Japanese Journal of Applied Physics, vol. 30, No. 8B, Aug., 1991, pp. L1483–L1485.
*Determination of a Track's Edge by Differential Power Spectrum* by Indeck, Mian, and Muller. Jpn. J. Appl. Phys., vol. 31 (1992) pp. L1065–L1067.
*Spatial Noise Phenomena of Longitudinal Magnetic Recording Media*, by Hoinville, Indeck, Muller. IEEE Transactions on Magnetics, vol. 28, No. 6. Nov. 1992.
*Measurements and Modeling of Noise in DC–Erased Thin–Film Media*, by Vos, Tanaka, Jud. IEEE Transactions on Magnetics, vol. 26, No. 5, Sep. 1990.
*Spatial Structure of Media Noise In Film Disks*, Yarmchuk. IEEE Transactions on Magnetics, vol. Mag–22, No. 5, Sep. 1986.
*Noise From Unsaturated DC Erasure and Peak Shift of Signals*, Ohara, Sato. IEEE Transactions on Magnetics, vol. Mag–23, No. 5, Sep. 1987.
*Novel Applications of Cryptography in Digital Communications*, by Omura. IEEE Communications Magazine, pp. 21–29, May 1990.
*A Physically Based Approach to Information Theory for Thin Film Magnetic Recording*, by O'Sullivan, Porter, Indeck, Muller. Proceedings of the Thirtieth Allerton Conference on Communication, Control, and Computing, Oct. 1992.
*Transverse Correlation Length in Thin Film Media*, by Mian, Indeck, Muller. IEEE Transactions on Magnetics, vol. 28, No. 5, pp. 2733–2735, Sep. 1992.
*A Magnetoresistive Gradiometer*, by Indeck, Judy, Iwasaki. IEEE Transactions on Magnetics, vol. 24, No. 6, pp. 2617–2619, Nov. 1988.
*An Analysis of Multilayered Thin–Film Magnetic Field Gradiometers Having a Superconducting Spacer*, by Indeck. Journal of The Magnetics Society of Japan, vol. 13, Supplement, No. S1 pp. 599–604 (1989).
*Interaction Factors of a Multi–Layered Magnetic Thin Film System*, by Mian, Indeck. IEEE Transactions on Magnetics, vol. 26, No. 5, pp. 2415–2417, Sep. 1990.

(List continued on next page.)

Primary Examiner—Walter E. Snow
Attorney, Agent, or Firm—Howell & Haferkamp, L.C.

[57] ABSTRACT

A method and apparatus is disclosed or determining the remanent noise in a magnetic medium by DC saturation of a region thereof and measurement of the remaining DC magnetization. Conventional recording transducers may be used to determine the remanent noise. Upon determination, the remanent noise may then be compensated for in either or both of the record and playback modes for all varieties of magnetic media including, videotapes, cassette tapes, etc.

13 Claims, 1 Drawing Sheet

OTHER PUBLICATIONS

*An interaction matrix for the energy analysis of an n-layered magnetic thin-film system,* by Mian, Indeck. *Journal of Magnetism and Magnetic Materials,* 96 (1991) 248–260.

*dc track edge interactions,* by Indeck, Reising, Hoinville, Muller. *Journal of Applied Physics,* 69 (8), pp. 4721–4723, 15 Apr. 1991.

*Track edge fluctuations,* by Muller, Indeck. *Journal of Applied Physics,* 67 (9), pp. 4683–4685, 1 May 1990.

*In Situ Measurement of the Remanence Curve of Magnetic Recording Media,* by Hoinville, Ornes, Murdock, Muller. *IEEE Transactions on Magnetics,* vol. 24, No. 6, pp. 2976–2978, Nov. 1988.

*An in situ measurement of intergranular coupling in magnetic film media,* by Mian, Indeck, Muller. *Journal of Applied Physics,* 73 (4), pp. 2027–2028, 15 Feb. 1993.

*Noise Characterization of Perpendicular Media,* by Indeck, Johnson, Mian, Hoinville, Muller. *Journal of the Magnetics Society of Japan,* vol. 15 Supplement, No. S2, pp. 173–178 (1991).

*Authentication of Forensic Audio Recordings,* by Koenig, *Journal of the Audio Engineering Society,* vol. 38, No. 1/2, pp. 3–33, 1990.

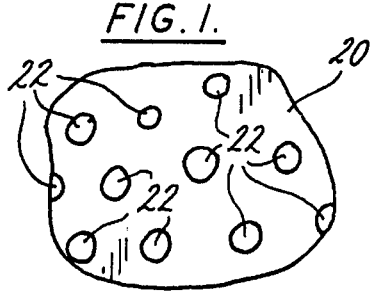
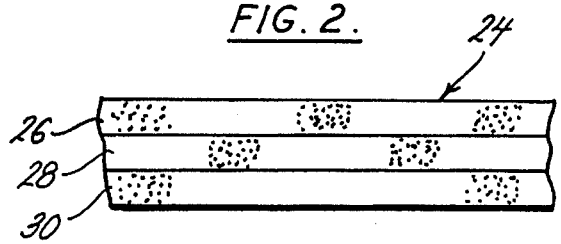
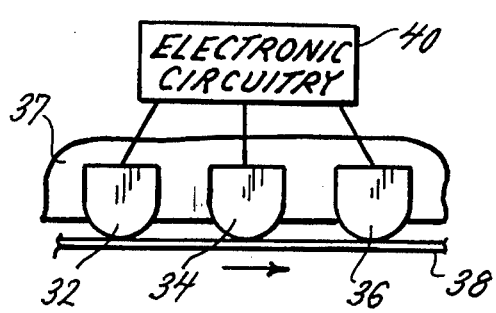
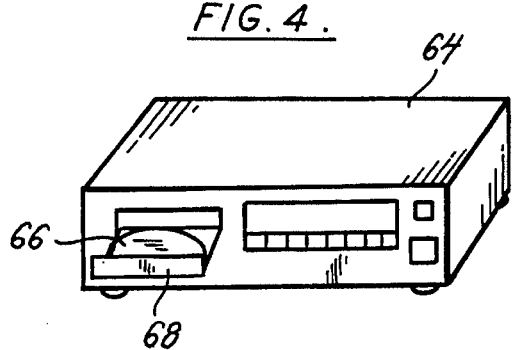
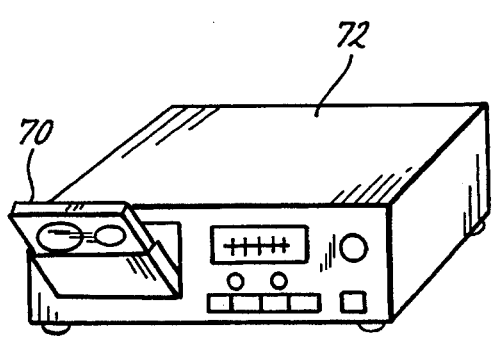
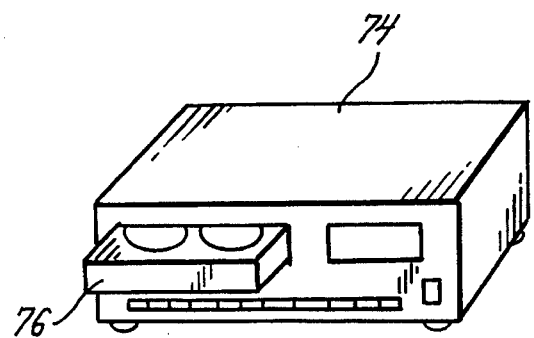

METHOD AND APPARATUS FOR NOISE REDUCTION IN MAGNETIC MEDIA RECORDINGS

BACKGROUND OF THE INVENTION

The sources of noise in a readback signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its determination. The inventors herein have recently demonstrated that this noise component is instead deterministic, i.e. is permanent and repeatable, depending entirely on the transducer-medium position and on the magnetic history of the medium. As confirmed by experiments conducted by the inventors herein, when the medium has had no signal written on it and has been recorded only with DC fields, the observed readback signals are almost identical. The magnetic contribution to the readback signal under these conditions results from spatial variations in the medium's magnetization: magnetic domains, ripple, local fluctuations of the anisotropy field-and saturization magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine its remanent state or remanent noise. The inventors have confirmed that this remanent noise is a function of the magnetic microstructure by comparing the remanent noise after a positive DC saturation with the remanent noise after a negative DC saturation. It has been found that these wave forms are virtual "mirror images" of each other thereby demonstrating a close correlation. Similarly, other methodologies were used to confirm that the remanent noise was determinative, repeatable, and related to the physical microstructure of the magnetic medium itself. Remanent noise arising from the permanent microstructure exhibits identifiable features characteristic of that permanent microstructure after practically any magnetic history. See *Spatial Noise Phenomena of Longitudinal Magnetic Recording Media* by Hoinville, Indeck and Muller, *IEE Transactions on Magnetics*, Volume 28, No. 6, November 1992, the disclosure of which is incorporated herein by reference.

The inventive technique disclosed and claimed herein relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the micro-structure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations. The actual deviations will be unique to a region of the medium's surface making this orientation deterministic and making its effects susceptible to elimination. As can be appreciated by those of ordinary skill in the art, noise reduction enables increase in storage capacity, increase in data rates, and eases the burden on transducers, medium, and system design and fabrication.

Although this discovery has been made by the inventors herein, noise reduction techniques based on this discovery have not been implemented. As this noise component of remanent noise is deterministic, it may be reliably repeated and measured at any particular point on a magnetic medium. Accordingly, the inventors have developed several techniques which take advantage of this fact for producing uncorrupted pre-recorded signals which may be played back by any playback device but which, when played back, have already been compensated for the remanent noise component. In other words, a magnetic recording may be recorded at the factory with a signal which has been first compensated for remanent noise such that as the signal is played back later the playback signal or read signal has the remanent noise component virtually eliminated. As the remanent noise component may very well be the most significant factor in noise emanating from pre-recorded magnetic media, this noise reduction technique may very well provide a dramatic reduction in noise with no required modification to the tremendous number of playback machines presently in the public's hands. This would include playback machines for the entertainment industry, etc. In a first embodiment of the invention, the remanent noise is first determined and the recording device compensates the original signal for the remanent noise before writing the compensated signal on the magnetic medium. These steps may be readily achieved with conventional recording transducers, as explained herein. Consequently, very little, if any, modification to existing recording equipment need be made to achieve these noise compensated recordings.

A second methodology will also create uncorrupted pre-recorded signals on magnetic medium. With this method, the signal is first written on the magnetic medium, the written signal is then read from the magnetic medium, this read signal is then compared with the original signal. The differences therebetween are determined to be noise, the greatest component of which is deterministic medium noise. The original signal is compensated to eliminate this noise before being recorded back at the same location on the magnetic medium. Thus, after the compensated signal has been recorded onto the magnetic medium, any other readback or playback machine would then produce a signal which has been compensated for remanent noise.

In still another embodiment of the present invention, the inventors have developed a methodology for compensating a signal read from a magnetic medium for remanent noise in real time. This methodology permits a playback device to be manufactured and sold which can play back pre-recorded magnetic medium which has not itself been compensated prior to recording, and produce a signal which is compensated on readback. With this method, the signal is first read from the magnetic medium, the remanent noise is determined for said magnetic medium, such as by saturating the magnetic medium and reading the remanent noise directly therefrom, and the signals are then compared to eliminate the noise from the original corrupted signal prior to use. As determining the remanent noise, as envisioned by the inventors, involves destroying the original recorded signal when the medium is saturated, another step to the method may well include re-recording either the original signal or its compensated counterpart. Thus, with this methodology, a playback device may take a pre-recorded magnetic medium whose signal has not been compensated, and transform it into a magnetic medium with a compensated signal recorded thereon such that further playbacks of the same magnetic medium would possibly not require compensation. With this methodology, if implemented in one alternative embodiment thereof, a user with a suitable playback machine may very well transform his entire collection of recorded media from non-compensated to compensated magnetic media. In other words, one may readily convert a collection of analog cassette tapes having original non-compensated signals thereon to a collection of analog cassette tapes having compensated signals recorded thereon which may then be played back by any playback device and produce what should be an enhanced signal because of the noise reduction.

In essence,.the present invention is elegantly simple and adapted for implementation by conventional recording transducers as are commonly found and used in virtually every read or read/write device presently utilized by the public at large. Such examples include cassette players, magneto-optic disc players, and VCRs. In its simplest implementation, a conventional recording transducer need merely DC saturate a specified portion of a magnetic medium, and then "read" or "play back" the remanent noise which remains. This remanent noise, which is an analog signal, may then be used to compensate an original signal, such as a musical program, dramatic reading, etc.

While the principal advantages and features of the invention have been described above, and a number of examples given, a greater understanding of the invention may be attained by referring to the drawings and the description of the preferred embodiment which follow.

BRIEF DESCRIPTION OF THE DRAWINGS

FIG. 1 is a magnified representative depiction of the microscopic structure of a region of magnetic medium;

FIG. 2 is a magnified depiction of several tracks of a magnetic medium having microscopic structure representatively shown thereon;

FIG. 3 depicts three conventional recording transducers and a magnetic medium traveling thereunder;

FIG. 4 is a perspective view of a magneto-optic disc player with a magneto-optic disc in its tray;

FIG. 5 is a cassette player depicting a cassette tape for play therein; and

FIG. 6 is a perspective view of a VCR with a tape ready for insertion.

DETAILED DESCRIPTION OF THE PREFERRED EMBODIMENT

As shown in FIG. 1, a region of magnetic medium 20 is built up with a plurality of microcrystalline structures 22 in a random pattern. This microcrystalline structure 22 is comprised of particles or grains varying from hundreds to thousands of Angstroms in diameter. The view of FIG. 1 is greatly enlarged and magnified in order to depict this physical phenomena. As shown in FIG. 2, this microcrystalline structure extends throughout the magnetic medium even though the magnetic medium 24 shown in FIG. 2 may be itself comprised of tracks 26, 28, 30 as well known in the art.

Referring now to FIG. 3, a plurality of conventional recording transducers 32, 34, 36 are shown mounted in a transducer transport 37 with a traveling magnetic medium 38 controllably driven past recording transducers 32, 34, 36 all as is well known in the art. Recording transducers 32–36 are all connected to electronic circuitry 40, as well known in the art, to control and read their input and output and further process signals for playback or other use. Although only three transducers 32, 34, 36 are being shown in FIG. 3, it will be well understood to those of ordinary skill in the art that a plurality of recording transducers of any number may just as easily be provided and, as taught herein, may be required in order to effect the purposes of the present invention. In implementing the present invention, the recording transducers 32–36 as shown in FIG. 3 may be considered as part of a device which is used to create pre-recorded magnetic medium with remanent noise compensated recordings. Alternately, the device shown in FIG. 3 may be considered as a playback unit of either a specialized playback device with means for creating a remanent noise compensated signal from a non-compensated pre-recorded signal, or a standard playback device which may be used to play back a remanent noise compensated magnetic medium. All of these functions are achieved with conventional recording transducers and therefore are readily implemented using existing and available technology.

A remanent noise compensated signal may be prerecorded onto a magnetic medium by utilizing the following method. The remanent noise of the magnetic medium may first be determined by DC saturating the medium and then reading the remanent noise with a conventional recording transducer. This would take transducer 32 to saturate the medium and transducer 34 to read the remanent noise. The original signal would then be compensated, using conventional compensation circuits as is well known in the art to modify the original signal such that it may then be recorded by recording transducer 36. In this manner, using this method and device as shown in FIG. 3, a pre-compensated recording, pre-compensated for remanent noise, may be created on magnetic medium 38. While there is a fixed and close spacing between transducers 32–36, the remanent noise is itself capable of being used for indexing the transducers 32–36 to thereby ensure that the compensated signal is recorded by transducer 36 for the remanent noise which in fact appears at that point on the magnetic medium for which said compensation has been made. This is because, as explained earlier herein, while the remanent noise is random, it is unique to any particular point on the magnetic medium and thus can be used to identify such point for benchmark purposes. While this is the perferred embodiment, it should be understood that the remanent noise is always there, whether the medium has been recorded over or not. Therefore, it is not strictly necessary that the specified portion of medium containing the remanent noise be DC saturated, or DC saturated in the same polarity in order to obtain the remanent noise.

In a variation of the first embodiment hereof, still another methodology may be used to create a prerecorded magnetic medium having a signal recorded thereon which is remanent noise compensated. This second embodiment involves the steps of first writing the original signal on the magnetic medium, such as for example by transducer 32 in FIG. 3, reading the recorded signal from said magnetic medium such as by transducer 34, comparing the read signal with the original signal to determine the differences therebetween, compensating the original signal, and then writing the compensated signal with transducer 36. Using this methodology, as with the first embodiment of the present invention, magnetic medium 38 would thus receive a recorded signal which has been compensated for the remanent noise inherent in the magnetic medium 38. These compensated recordings may then be played back by any conventional playback device and produce a signal which is noise compensated. This is important as with this implementation of this embodiment, uncorrupted copies or noise compensated copies of prerecorded signals may be produced and made available for play back by the large number of playback devices already in the public's hands. This could very well be implemented for improving the pre-recorded playback of musical and dramatic programs on magneto-optic discs, cassette tapes (analog and digital), and VCR video tapes.

In still another implementation of the noise compensation methodology of the present invention, a playback device may be manufactured and sold which is capable of producing a noise compensated signal from recordings on magnetic media which have not been noise compensated. In this embodiment of the present invention, the signal is first read, such as by recording transducer 32 in FIG. 3, the remanent noise is then determined such as by saturating the magnetic medium with a signal from transducer 34 and reading the remanent noise with transducer 36, and then the original signal would be compensated with said remanent noise prior to playback or other processing. Although not specifically shown, a fourth transducer may be provided to re-record either the original signal or the compensated signal back on the magnetic medium 38 for subsequent playback. With this device and method, conventional recordings on magnetic media may be compensated for remanent noise prior to playback. Also, perhaps while being played, magnetic media may be transformed from uncompensated to noise compensated recordings. Thus, with this implementation, a device may be made and sold for use with the vast inventory of pre-recorded magnetic media presently in the public's hands.

In still another implementation of the present invention, the unique remanent noise pattern may be used as a benchmark to locate a transducer at a particular position in a magnetic medium. For example, for editing purposes, and as previously explained above, the conventional recording transducers 32–36 as shown in FIG. 3 could be readily used to determine the remanent noise at a particular position on the magnetic medium 38. This could then be used to reposition the transducers 32–36 at the start or finish of an edit, or otherwise to precisely position a conventional recording transducer with respect to the magnetic medium. This application would provide significant advantages in dubbing, etc. which is commonly used for taking rough cuts of many kinds of programs and editing them for final production. For that matter, editing is used in a large number of applications too numerous to mention herein. In each of these applications, it is desired to accurately and reliably reposition a recording transducer to ensure the continuity of the signal and program through the discontinuity created by the editing process. As the inventors' methodology provides a convenient and simple way to most accurately determine the exact position on a magnetic medium, and to find that exact position, the present invention provides a unique and novel-way to position a recording transducer for editing.

As shown in FIG. 4, a magneto-optic disc player 64 has a magneto-optic disc 66 in its tray 68 ready for play. As explained herein, a magneto-optic disc player 64 may play back remanent noise compensated magneto-optic discs 66. Furthermore, although not presently commercially available for home use, magneto-optic disc players 64 may soon be available which are capable of recording onto magneto-optic discs 66. In such event, all of the embodiments of the present invention may be implemented such that magneto-optic discs 66 may be noise compensated when played back, even though its original signal was not recorded in a noise compensated format, and CD player 64 used to re-record a noise compensated signal back onto magneto-optic disc 66.

Similarly, a cassette player 72 as shown in FIG. 5 has a cassette 70 being inserted therein for play. This magnetic medium is also susceptible to implementation of the inventors' methodologies to enhance the record and/or playback of cassette 70 in remanent noise compensated format.

A last example of an implementation of the inventors' methodologies is shown in FIG. 6 and includes a VCR 74 with a video tape cassette 76 being inserted therein. As the video tape cassette 76 is a magnetic medium, it is also susceptible to the noise compensation methodologies disclosed and claimed herein.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A method for writing a noise compensated source signal onto a magnetic medium with a device having a conventional recording transducer, said method comprising the steps of:

continuously determining the remanent noise of said magnetic medium as said magnetic medium is traversed by a conventional recording transducer said remanent noise being represented by an analog electrical signal;

continuously compensating said source signal for said remanent noise as said remanent noise is determined; and writing said compensated source signal on said magnetic medium;

wherein the step of determining includes the steps of:
saturating said magnetic medium; and
reading said remanent noise from said saturated magnetic medium.

2. The method of claim 1 wherein said device includes three aligned recording transducers and wherein the step of saturating is implemented with one of said recording transducers, the step of reading is implemented with another of said recording transducers, and the step of writing is implemented with the third of said recording transducers.

3. The method of claim 2 further comprising the step of:

indexing said recording transducers with said remanent noise to thereby write said compensated source signal at the point on said magnetic medium where said remanent noise has been compensated for.

4. A method for writing a noise compensated source signal onto a magnetic medium with a device having a conventional recording transducer, said method comprising the steps of:

continuously determining the remanent noise of said magnetic medium as said magnetic medium is traversed by a conventional recording transducer, said remanent noise being represented by an analog electrical signal;

continuously compensating said source signal for said remanent noise as said remanent noise is determined; and writing said compensated source signal on said magnetic medium;

wherein the step of determining the remanent noise includes the steps of:

first writing said source signal onto said magnetic medium; and reading said source signal from said magnetic medium.

5. The method of claim 4 wherein the step of determining the remanent noise includes the step of comparing said read source signal with the source signal as first written.

6. A method for creating a magnetic medium with a source signal written thereon which, when read, has already been compensated for the remanent noise in said magnetic medium, the method comprising the steps of:

writing said source signal on said magnetic medium;

reading said source signal from said magnetic medium;

compensating said source signal for the differences between it and said read source signal, said differences being indicative at least in part of the remanent noise of said magnetic medium; and writing said compensated source signal onto said magnetic medium and at the same location thereon as originally written.

7. A method for continuously compensating a source signal as it is read from a magnetic medium for the remanent noise of said medium, said method comprising the steps of:

continuously reading said source signal from said magnetic medium;

continuously determining the remanent noise of said magnetic medium; and continuously compensating said source signal for said remanent noise as it is read from said magnetic medium.

8. The method of claim 7 wherein the step of determining further comprises the steps of:

saturating said magnetic medium; and reading said saturated magnetic medium to thereby determining its remanent noise.

9. The method of claim 8 wherein the step of determining the remanent noise is performed closely after the step of reading said source signal so that said source signal may be compensated in a relatively short time delay.

10. A method for compensating a source signal read from a magnetic medium for the remanent noise of said magnetic medium in real time, said method comprising the steps of:

reading said source signal from said magnetic medium with a first recording transducer;

saturating said magnetic medium with a second recording transducer, said second recording transducer being aligned with and closely spaced behind said first recording transducer to thereby saturate said magnetic medium after only a short time delay from reading;

reading said saturated magnetic medium with a third recording transducer to thereby continuously determine the remanent noise thereof, said third recording transducer being aligned with and closely spaced behind said first recording transducer to thereby determine said remanent noise after only a short time delay from saturating; and continuously compensating said source read signal with said remanent noise signal as both said signals are generated to thereby continuously produce a compensated source signal in real time.

11. A method for determining a benchmark in a magnetic medium, said method comprising the steps of:

saturating a portion of said magnetic medium; and reading said saturated portion of said magnetic medium to thereby determine its remanent noise, said remanent noise being unique to said portion and therefore a benchmark identifying said portion.

12. A magnetic medium having a compensated source signal recorded thereon made by implementing a method comprising the steps of:

writing a source signal on said magnetic medium;

reading said source signal from said magnetic medium;

compensating said source signal for the differences between it and said read source signal, said differences being indicative at least in part of the remanent noise of said magnetic medium; and writing said compensated signal onto said magnetic medium and at the same location thereon as originally written.

13. A device for compensating a signal read from a magnetic medium for the remanent noise of said magnetic medium, said device including:

means for reading said signal from said magnetic medium with a first recording transducer;

means for saturating said magnetic medium with a second recording transducer, said second recording transducer being aligned with and closely spaced behind said first recording transducer to thereby saturate said magnetic medium after only a short time delay from reading;

means for reading said saturated magnetic medium with a third recording transducer to thereby continuously determine the remanent noise thereof, said third recording transducer being aligned with and closely spaced behind said first recording transducer to thereby determine said remanent noise after only a short time delay from saturating; and means for continuously compensating said read signal with said remanent noise signal as both said signals are generated to thereby continuously produce a compensated signal in real time.

* * * * *

UNITED STATES PATENT AND TRADEMARK OFFICE
CERTIFICATE OF CORRECTION

PATENT NO. : 5,587,654
DATED : December 24, 1996
INVENTOR(S) : Indeck et al.

It is certified that error appears in the above-identified patent and that said Letters Patent is hereby corrected as shown below:

In column 3, line 23, remove the period between "essence," and "the".

In column 1, line 25, replace "saturization" with -- saturation --

Signed and Sealed this

Twenty-third Day of February, 1999

Attest:

Q. TODD DICKINSON

Attesting Officer    Acting Commissioner of Patents and Trademarks